Figure 2:
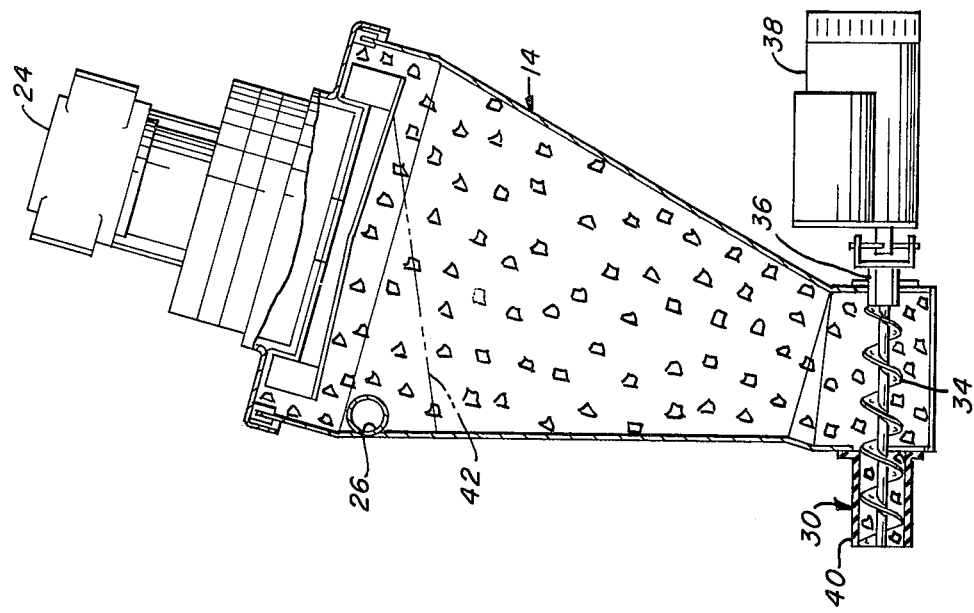

United States Patent [19]
Boring

[11] 3,954,303
[45] May 4, 1976

[54] VACUUM LOADER SYSTEM
[75] Inventor: Douglas James Boring, Franklin, Pa.
[73] Assignee: Conair, Inc., Franklin, Pa.
[22] Filed: Dec. 23, 1974
[21] Appl. No.: 535,228

[52] U.S. Cl. .................................. 302/62; 222/413
[51] Int. Cl.² ................................................ B65G 53/40
[58] Field of Search ................... 222/1, 413, 55, 56; 302/62, 66; 418/220; 415/72, 169 A, DIG. 4, 213 C

[56] References Cited
UNITED STATES PATENTS

| | | | |
|---|---|---|---|
| 522,458 | 7/1894 | Duckham | 302/62 |
| 539,325 | 5/1895 | Zedler et al. | 302/62 X |
| 1,211,743 | 1/1917 | Newlon | 302/62 |
| 2,428,995 | 10/1947 | Rogers | 222/413 X |
| 2,556,058 | 6/1951 | Boon | 302/62 X |
| 3,165,195 | 1/1965 | Sass et al. | 222/55 X |

*Primary Examiner*—Allen N. Knowles
*Assistant Examiner*—Hadd Lane

[57] ABSTRACT

A vacuum loader system and more particularly an improved means for metering a predetermined quantity of color concentrates and/or pelletized additives to a virgin or virgin-regrind mixture in a vacuum loader system of a type utilized in transporting materials used in plastic molding processes from the respective storage bins thereof to a plastic processing machine.

13 Claims, 2 Drawing Figures

U.S. Patent  May 4, 1976  3,954,303

VACUUM LOADER SYSTEM

In the plastic industry it is common practice to transport finely divided, granular or pulverant material from a storage bin, through a feed pipe to a material receiving chamber by creating a vacuum in the receiving chamber to draw the material from the storage bin into the feed pipe. The material in the receiving chamber is used to charge a plastic processing machine.

In many instances it is desirable to add a predetermined quantity of color concentrates or other pellet additives, such as stabilizers or plasticizers, directly into the materials within the storage bin prior to the discharge of such materials to the processing machine. A common arrangement used heretofore for adding the additives was an independent additive storage bin from which a predetermined quantity of additive would be fed into the main material storage bin. Such an arrangement has proved to be satisfactory in most instances; however, inasmuch as the metering arrangement was dependent to some degree on the head or the weight of the additives in the storage bin above the discharge, the quantity of additives added to the main storage bin could vary in a given unit of time of operation of the metering assembly. Inasmuch as in many instances an exact quantity of additive is important for color uniformity and/or the uniformity of physical characteristics of a given run of molded articles, even slight variations in the amount of additives conveyed to the main material storage bin could produce a substantial adverse effect on product uniformity.

By means of the present invention which includes a timed sequence of operations to maintain a constant head of additive materials above the metering assembly the hereinabove mentioned problems of varying quantity of additives per given timed operation of the metering assembly are greatly alleviated.

An additional problem with some of the additive arrangements used heretofore resides in the fact that many of such arrangements used a metering assembly comprised of a screw conveyor or auger feed to convey materials from the additive storage bin to the main storage bin. Such screw conveyors have generally proved satisfactory; however, inasmuch as the augers therefor have at least portions thereof disposed within a rigid cylinder it was possible that pelletized additives could become lodged intermediate the inner periphery of the cylinder and the outer periphery of the auger thus resulting in increased wear with respect to the auger and cylinder an also an increased strain on the motor utilized to drive the auger.

To alleviate the problems described immediately hereinabove, the present invention additionally includes a screw conveyor or auger feed wherein the sleeve surrounding at least a portion of the auger is formed of a readily deformable elastomer. With such a deformable sleeve arrangement, if pelletized additives were to work their way from the main conveying channel to the outermost periphery of the auger such material will pass back into the main conveying channel due to the inherent flexibility of the elastomer sleeve. An additional significant advantage in the utilization of an elastomeric sleeve is that such sleeve in conjunction with the auger will act as a flexible nozzle or valve which would be significant if it were desired to include an integral vacuum loading feature with an additive storage bin. In other words, if such a deformable sleeve feature were included, a vacuum to draw additional additive could be easily developed within the additive storage bin because the deformable sleeve would aid in decreasing air loss by deforming to provide a tight fit between the inner periphery thereof and the outermost periphery of the augers.

Figure 1:
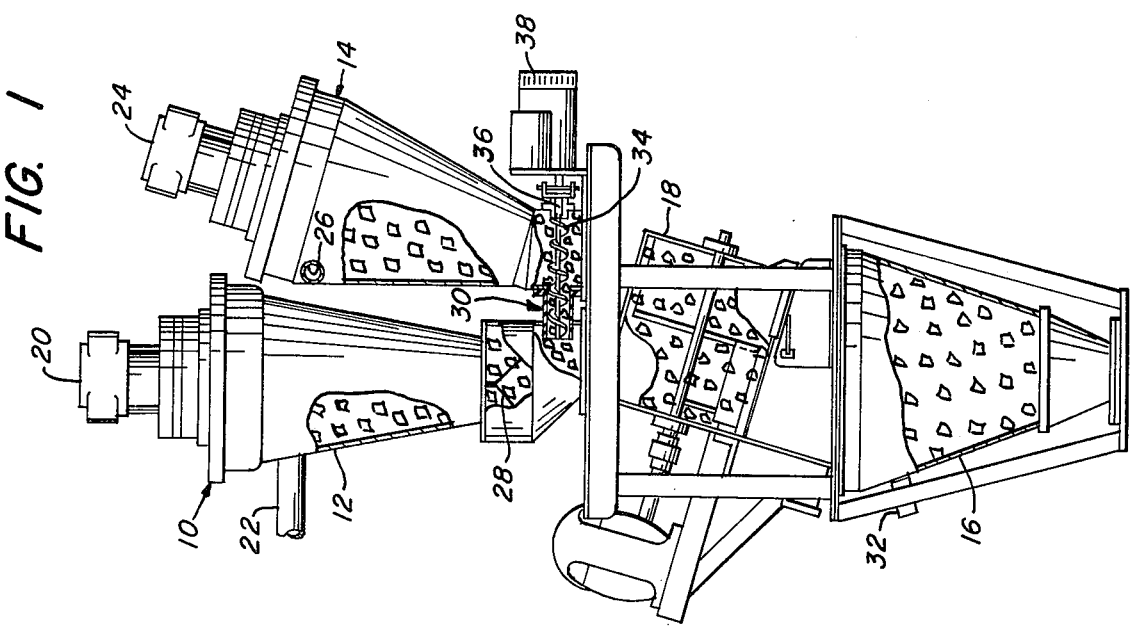

These and other objects and advantages of the present invention will become more readily apparent upon a reading of the following description and drawings in which:

FIG. 1 is a side elevational view, partly schematic, of a vacuum loader system constructed in accordance with the principles of the present invention; and FIG. 2 is an enlarged side elevational view, partly schematic, of the additive storage hopper illustrated in FIG. 1.

FIG. 1 illustrates a vacuum loader system 10 embodying the principles of the present invention and as shown comprises: transversely spaced main material and additive storage hopper assemblies 12 and 14, respectively; a lower feed hopper assembly 16 spaced vertically downwardly from hopper assemblies 12 and 14; and a mixer assembly 18 located intermediate hopper assemblies 12 and 14 and feed hopper assemblies 16. Loader system 10 is of a type for transporting finely divided or granular material from a storage bin to a processing machine and in the particular system illustrated in FIG. 1 is utilized in transporting raw material for plastic molding processes from the respective storage bin thereof (not shown) to a plastic processing machine (not shown).

To transport materials to the main material hopper assembly 12 from the storage bin, a vacuum motor 20 which is carried adjacent the upper end of hopper assembly 12 is energized thereby drawing material through conduit 22 and into hopper assembly 12. In the illustrated embodiment conduit 22 communicates with hopper assembly 12 adjacent the upper end thereof. A plurality of conduits such as conduits 22 may be provided such that proportional amounts of different materials may be drawn from independent sources, for example, proportional quantities of uncolored virgin plastic and regrind material may be selectively introduced into the main storage hopper assembly 12 simultaneously or sequentially.

Additive storage hopper assembly 14 is included to provide storage means for color concentrates or other pellet additives, such as stabilizers or plasticizers, which are to be added to the material in the main hopper assembly 12 prior to such material being discharged into the feed hopper assembly 16. Transporting additive material to the additive storage hopper assembly 14 is substantially identical to the type of system described hereinbefore with respect to hopper assembly 12 inasmuch as a vacuum motor 24 which is carried adjacent the upper end of additive hopper assembly 14 is energized thereby drawing additive through conduit 26 and into additive hopper assembly 14. As shown, conduit 26 communicates with hopper assembly 14 adjacent the upper end thereof.

Subsequent to filling main hopper assembly 12 with the desired quantities of raw materials a suitable valve means such as conic valve assembly 28 is energized thereby permitting the materials to fall by gravity from hopper assembly 12 into the mixer assembly 18. Valve assembly 28 is carried by hopper assembly 12 adjacent the lower end thereof and comprises a frusto conical upwardly and inwardly tapering member which is suitably dimensioned to close the exit throat of hopper assembly 12 when desired. Further description of a suitable valve means such as conic valve assembly 28 reference is hereby made to U.S. Pat. No. 3,635,377.

An additive feed assembly 30 is positioned adjacent the lowermost ends of hopper assemblies 12 and 14 and communicates therebetween. If for aesthetic, chemical or physical reasons an additive is to be added to the main material being fed to the processing machine, the feed assembly 30 is energized to feed a proper quantity of additive from additive hopper assembly 14 to the flow of material being discharged from hopper assembly 12 into the mixer assembly 18. The energization of feed assembly 30 is substantially simultaneously with the introduction of raw materials from hopper assembly 12 into mixer assembly 18. The mixing action of mixer assembly 18 is continuous during the operating cycle of the system thereby insuring a plastic raw material which is uniformly coated or completely interspersed with the additive from additive hopper 14. When the mixing of the plastic material within the mixer assembly 18 is complete a suitable gate (not shown) adjacent the lower end of mixer assembly 18 is opened thereby allowing the mixed plastic material within assembly 18 to gravity fall into the lower feed hopper assembly 16 wherefrom the material eventually enters the plastic processing machine.

Feed assembly 30 is rendered operational for a selectively variable time sequence and is positioned adjacent the lowermost end of additive hopper assembly 14. These facts coupled with the selective energization of vacuum motor 24 determine that the quantity of additive material fed to mixer assembly 18 during the timed sequence of operation of feed assembly 30 is dependent to some degree on the head or the height of the column of additive within additive hopper assembly 14 which is above feed assembly 30. This conclusion was recognized in the present invention and to insure an accurate and consistent quantity of metered additive the present invention provides a method of operation of the vacuum loader system 10 whereby prior to the initiation of each timed sequence of operation of feed assembly 30 the additive storage hopper assembly 14 is completely filled with additive thereby providing a consistent reference head of additive above feed assembly 30. The method of operation of vacuum loader 10 which maintains the consistent reference head is as follows:

1. Any suitable level sensor, such as sensor 32, which is described in U.S. patent application Ser. No. 231,963, filed Mar. 6, 1972 and assigned to the same assignee as is this invention, detects that the level of material within lower feed hopper 16 has fallen below a predetermined level and starts two functions substantially simultaneously, a. filling of main storage hopper assembly 12 is initiated by energization of vacuum motor 20, and
   b. filling of additive hopper assembly 14 is initiated by energization of vacuum motor 24 to draw in the same amount of additive metered out in the previous cycle. In the particular illustrated embodiment the filling of assembly 14 is in less time than the filling of assembly 12 Note: A typical quantity of additive metered out in a cycle is indicated by phantom additive level line 42 in FIG. 2.

2. Subsequent to filling of assembly 12, opening valve assembly 28 to permit material from assembly 12 to fall into mixer assembly 18;

3. Closing valve assembly 28 and energizing feed assembly 30 for a timed sequence to feed a prescribed quantity of additive from additive hopper assembly 14 into mixer assembly 18;

4. Blending the virgin material and additive within mixer assembly 18 for a predetermined period of time and thereafter discharging the mixed material into the lower feed hopper assembly 16; and 5. If the level of material within feed hopper assembly 16 is still below the level of sensor 32, repeating the above sequence.

Feed assembly 30 comprises: an elongated generally horizontally extending screw or auger-like flight conveyor 34 having a shaft extension portion 36 rotated by a selectively energizable auger drive motor 38. Screw conveyor 34 extends across substantially the entire lower or discharge throat portion of additive hopper assembly 14 and passes therefrom into open communication with a lowermost portion of main hopper assembly 12 at a location vertically intermediate valve assembly 28 and mixer assembly 18.

Feed assembly 30 additionally includes a readily deformable, annular, generally cylindrical elastomeric screw conveyor housing 40 having an inner diameter substantially equal to the outermost diameter of the screw conveyor 34. As shown, housing 40 has one end thereof sealingly secured to additive hopper assembly 14 and the other end thereof is sealingly received within main hopper assembly 12 adjacent the lowermost end thereof. The end portion of screw conveyor 34 extending between hopper assemblies 12 and 14 is isolated from ambient by being coaxially received within housing 40. By utilization of the elastomeric housing 40 any potential for binding caused by pelletized additive becoming lodged intermediate the inner diameter of housing 40 and the outermost diameter of the screw conveyor 34 is greatly lessened because the housing expansion allows such lodged particles to readily pass in the direction of material flow. Maintaining binding in a minimum allows a smoother and quieter operation as well as aiding in preventing wear between housing 40 and screw conveyor 34. Furthermore a reduction in binding reduces variations of speed of drive motor 38 and further lessens instances of total stalling out of motor 38 which can result in motor burnout.

In the preferred embodiment described hereinabove, motor 24 is of the vacuum type and the efficiency in the use thereof to create a suction for the loading of hopper assembly 14 with additive via conduit 26 is determined at least in part by the ability to create a controlled sealing arrangement at the discharge exit from hopper assembly 14. Accordingly, an additional advantage of the housing 40 being of a readily deformable elastomeric material results when the additive hopper assembly is loaded by means of a suction. In other words when vacuum motor 24 is energized to create a suction within assembly 14 for filling assembly 14 with an additive, the pressure differential causes housing 40 to deform radially inwardly thereby creating a tighter seal between housing 40 and the outermost peripheral portion of screw conveyor 34 adjacent thereto. This creation of a better seal reduces the suction losses between housing 40 and screw conveyor 34 thereby aiding in more efficient suction loading to additive hopper assembly 14.

It is to be noted that the embodiment illustrated hereinabove is merely a preferred embodiment incorporating the principles of the present invention and it is to be recognized that modifications can be made thereto by one skilled in the art without departing from the scope of the invention which only is defined by the claims set forth hereinafter, for example: a loading arrangement including hopper assembly 12 and 14 could be utilized to discharge directly into a processing machine or a weighing system without passing through a mixer 14 or a lower hopper assembly 16; in the sequence of operation the filling of hopper assembly with additional additive may be completed prior to the filling of hopper assembly 14; and the like.

What is claimed is:

1. A vacuum hopper assembly comprising: a material receiving hopper member having a material entrance section and a material discharge means; suction means operable to draw material through said entrance section and into said hopper member and initiate a flow of ambient air through said discharge means into said hopper member, and said discharge means having a deformable portion deformable in response to said initial flow of ambient air to engage a non-deformable portion thereof to provide an ambient air seal therebetween.

2. A vacuum hopper assembly as specified in claim 1 wherein said deformable portion extends externally of said hopper member.

3. A vacuum hopper assembly as specified in claim 2 wherein said non-deformable portion comprises an elongated screw type conveyor.

4. A vacuum hopper assembly as specified in claim 2 wherein said deformable portion consists of an elastomeric cylindrical member.

5. A vacuum hopper assembly as specified in claim 4 wherein said non-deformable portion comprises an elongated screw type conveyor having a plurality of convolutions thereof located within said cylindrical member.

6. A vacuum hopper assembly as specified in claim 5 additionally including another hopper member spaced from said first mentioned hopper member and said deformable portion sealingly communicates between said discharge means of said first mentioned hopper member and the interior of said another hopper member.

7. A vacuum hopper assembly as specified in claim 5 wherein the inner diameter of said cylindrical member is substantially no greater than the outermost diameter of the portion of said screw conveyor which is received therewithin.

8. A method of conveying material into a hopper assembly having material entrance and discharge portions comprising the steps of: applying a suction to said hopper assembly to draw material through said entrance portion and into said hopper assembly and initiate a flow of ambient air through said discharge portion into said hopper assembly, and at least partially deforming said discharge portion in response to said flow of ambient air therethrough to discontinue any substantial subsequent flow of ambient air therethrough.

9. A method as specified in claim 8 wherein the degree of said deforming determined by the suction applied to said hopper assembly.

10. A method as specified in claim 8 having said deformation occur externally of said hopper assembly.

11. A method of dispensing a specific quantity of a granular or pulverant material on a repetitive basis comprising, conveying at spaced time intervals specific quantities of a granular or pulverant material from a supply thereof reposing in a substantially larger given quantity above a positive displacement means and reestablishing said given quantity at spaced time intervals intermediate said first mentioned time intervals.

12. The method as specified in claim 11 in which said given quantity is within a chamber and said reestablishing is by means of a vacuum granular or pulverant material conveying system cooperable with said chamber the further step of maintaining an air seal in conjunction with said positive displacement means during each reestablishment of said given quantity.

13. A method as specified in claim 11 with additionally mixing said conveyed material with a different granular or pulverant material with each said mixing being initiated subsequent to a reestablishment of said given quantity.

* * * * *